Oct. 19, 1965   L. H. RICE ETAL   3,212,778
BOWLING BALL AND PIN SEPARATOR AND CONVEYOR
Filed May 28, 1962   4 Sheets-Sheet 1

Leo H. Rice
Ira J. Rice
INVENTORS

BY *Clarence A. O'Brien*
*and Harvey B. Jacobson*
Attorneys

Oct. 19, 1965  L. H. RICE ETAL  3,212,778
BOWLING BALL AND PIN SEPARATOR AND CONVEYOR
Filed May 28, 1962  4 Sheets-Sheet 2

Leo H. Rice
Ira J. Rice
INVENTORS

Leo H. Rice
Ira J. Rice
INVENTOR.

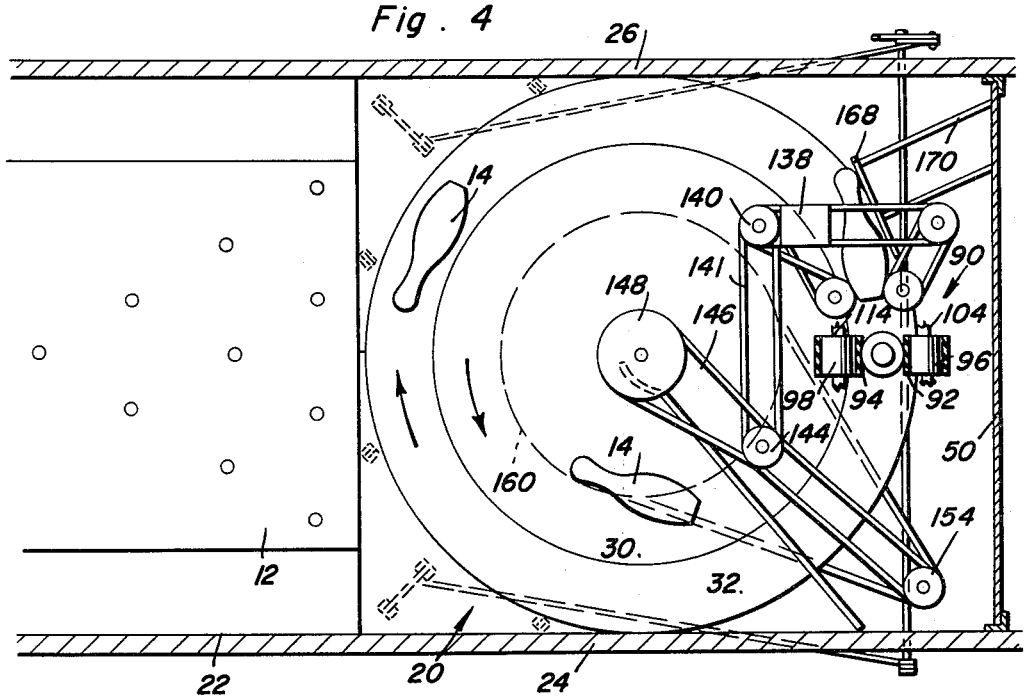
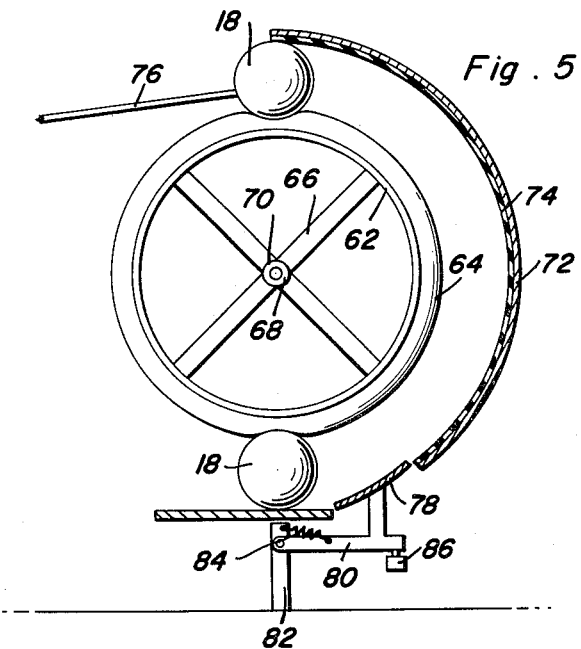
Leo H. Rice
Ira J. Rice
INVENTORS

United States Patent Office 3,212,778
Patented Oct. 19, 1965

3,212,778
BOWLING BALL AND PIN SEPARATOR
AND CONVEYOR
Leo H. Rice and Ira J. Rice, both of Highway 75,
Bellevue, Nebr.
Filed May 28, 1962, Ser. No. 198,110
8 Claims. (Cl. 273—43)

The present invention generally relates to an improved and novel apparatus for use in conjunction with a bowling alley and more particularly a mechanism for separating bowling balls and pins and conveying the bowling balls to a ball return mechanism and conveying the pins to a turret mechanism for subsequent spotting on the pin deck.

There heretofore has been provided various arrangements for receiving the bowling pins and balls in the pit at the end of the bowling alley and automatically spotting the pins on the pin deck of the alley and returning the ball to the other end of the alley. While such devices have been successful to a certain extent, certain problems still exist. One of the problems existent in such machines is their inability to accurately discriminate between bowling balls and pins and to properly separate the pins from the balls. Accordingly, it is the primary object of this invention to provide a novel turntable assembly which forms the bottom of the pit and which receives the pins and balls, the turntable assembly including counter-rotating inner and outer tables arranged concentrically with each other whereby the pins and balls will be spread out over a larger surface area since the pins and balls on the inner table will move in a direction opposite to the pins and balls on the outer table thereby enabling the pins and balls to be more evenly distributed over a greater surface area for easier picking up and conveying of the pins and balls.

Another object of the present invention is to provide a bowling ball and pin separator and conveyor including a pair of upright rubber belts together with rubber covered feed rollers rotatable about vertical axes for receiving pins from the outer turntable and conveying them upwardly by grasping the belly part of the pin with the neck portion thereof depending downwardly. The upper end of the flat belt conveyors is provided with a pair of metallic disks with resilient annular portions thereon for grasping the bowling pins and discharging them onto a V-belt conveyor which conveys the pins in inverted position to a turret head which forms no part of the present invention.

A further important object of the present invention is to provide a bowling ball and pin separator and conveyor having elevatable corner elements in the pit enclosing the outer surface of the outermost turntable which corner portions are inclined upwardly at the outer edges thereof for assuring that all balls and pins will be disposed on the turntable assembly, such corner elevating mechanism being operable in response to operation of the sweeper bar mechanism which does not form any part of the invention except that the drive mechanism for the sweeper bar mechanism also serves to operate the corner elevating mechanism.

Yet another important feature of the present invention is to provide a bowling ball and pin separator and conveyor in accordance with the preceding objects in which the ball conveying mechanism includes a driven wheel with a pneumatically inflated tire thereon similar to a bicycle wheel and tire together with a concentrically arranged trackway whereby the bowling ball will be rolled along said trackway by the driven wheel for elevation and deposit on a return mechanism which may be in the form of an inclined ramp or the like for conveying the ball back to the other end of the alley.

Yet another very important feature of this invention is the provision of a resiliently mounted pit cushion in an arrangement in which the pit cushion is disposed at a predetermined elevation above the turntable assembly whereby one end of the pit cushion is open for enabling the bowling balls to proceed only through this end of the pit cushion while the bowling pins may go under the pit cushion at any point, there also being provided novel deflector means for assuring proper orientation of the bowling pins and balls as they are moved by the counter-rotating turntables.

Yet another important object of this invention is to provide a bowling ball and pin separator and conveyer in accordance with the preceding objects which is still relatively simple in construction, easy to install, easy to repair and maintain, dependable, longlasting, foolproof in operation and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a top plan view illustrating the structural details of the drive mechanism as well as the pin feeding and elevating mechanism;

FIGURE 5 is a detailed sectional view illustrating the particular construction of the ball conveying and elevating mechanism;

Figure 1:
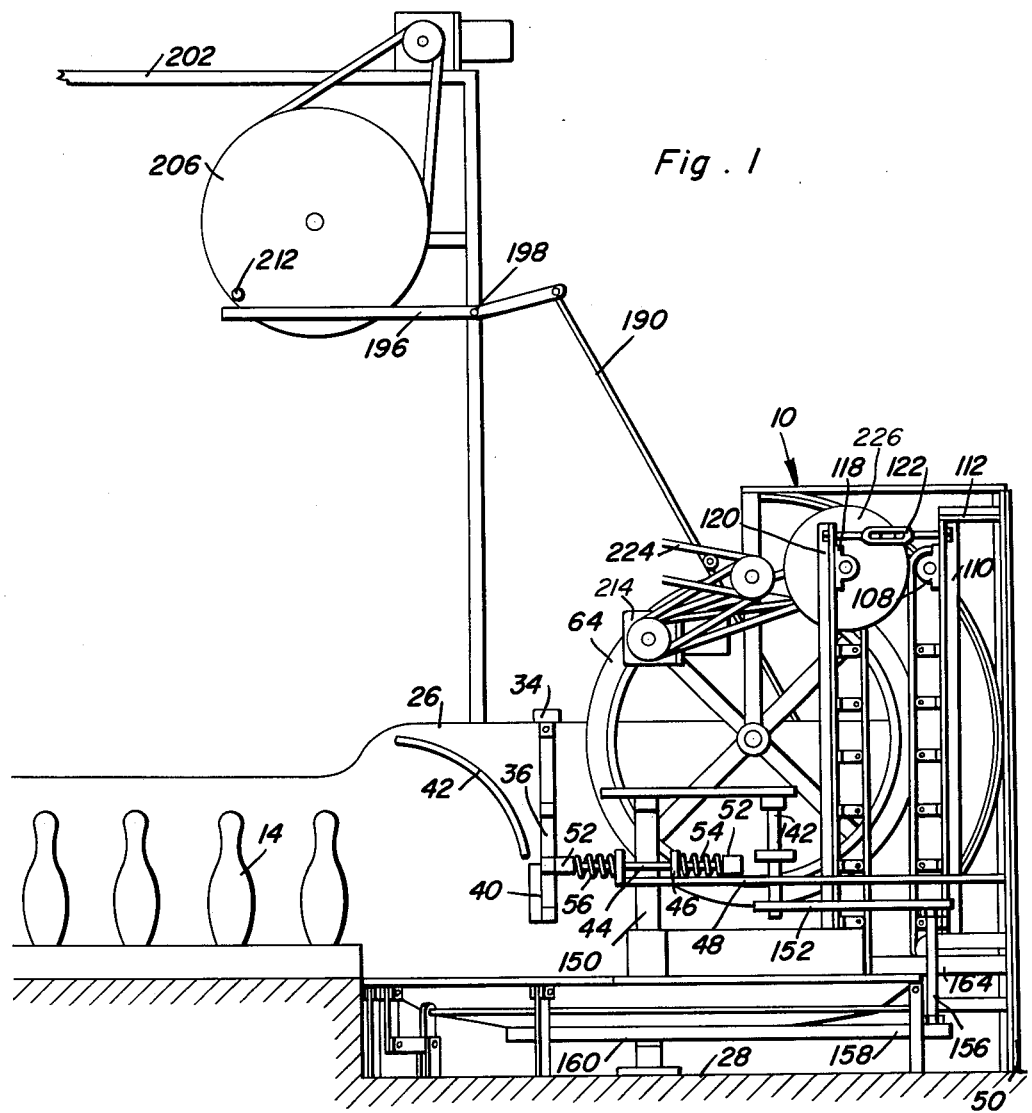
FIGURE 1 is a side elevational view of the present invention with one side wall or kickback removed illustrating the orientation of the components of the present invention.

Referring now specifically to the drawings, the numeral 10 generally designates the bowling pin and ball separator and elevator of the present invention which is orientated at the pit end of a conventional bowling alley 12 having the usual bowling pins 14 on the pin deck 16 whereby a bowling ball 18 engaging the pins 14 will knock the pins off of the pin spot into the pit area generally designated by the numeral 20 or into the gutters 22. The gutters 22 may have a rearwardly moving conveying mechanism incorporated therein for assuring that all balls and pins will be moved to the pit area 20 or the sweeper bar mechanism may be employed for moving any balls and pins which land in the gutter to the pit area 20. A pair of side walls or kickbacks 24 and 26 are provided which serve to retain the bowling pins within the confines of the bowling alley and prevent lateral movement of the pins and balls outwardly of the bowling alley. The construction of the bowling alley itself, the gutters, the kickbacks, the bowling pin and bowling ball all are conventional in nature and form no particular part of the present invention except for their association with the bowling ball and pin separator and conveyor 10.

Figure 2:
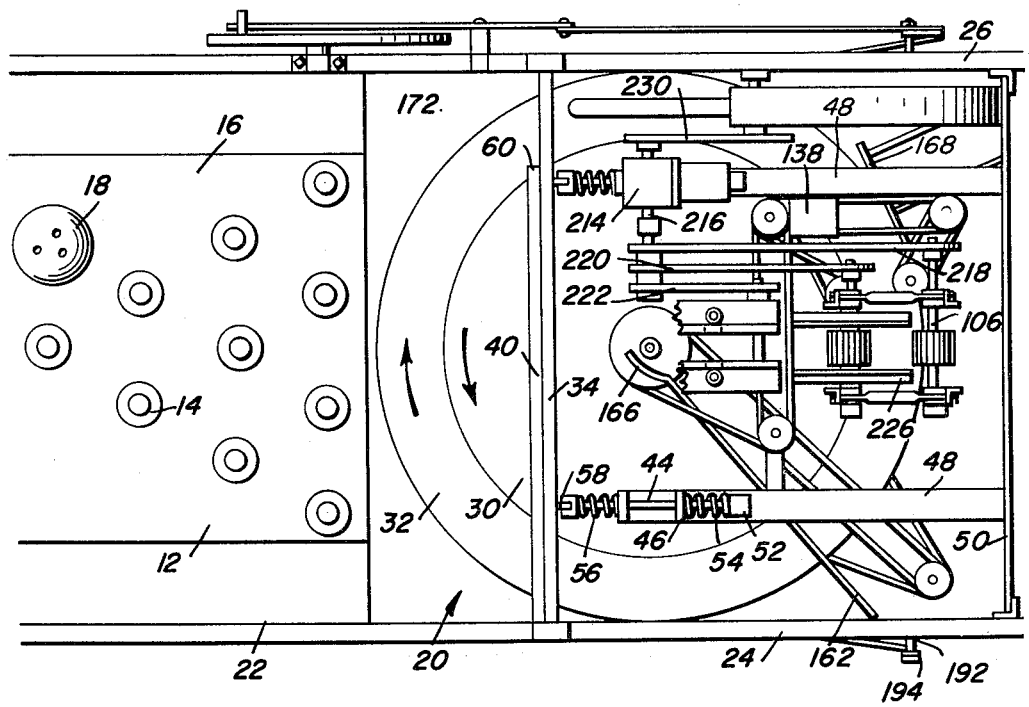
FIGURE 2 is a top plan view of the construction of the present invention.
Figure 6:
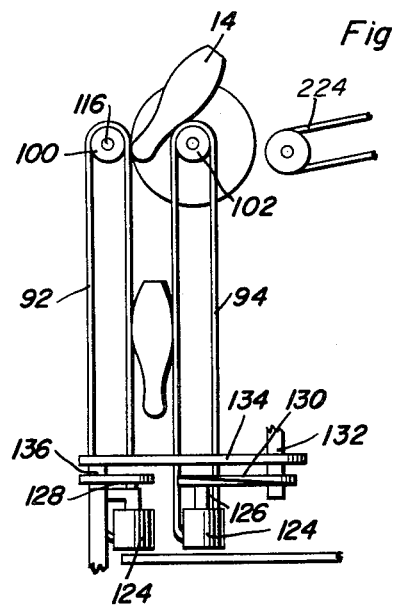
FIGURE 6 is a detailed view illustrating the bowling pin elevating mechanism.
Figure 3:
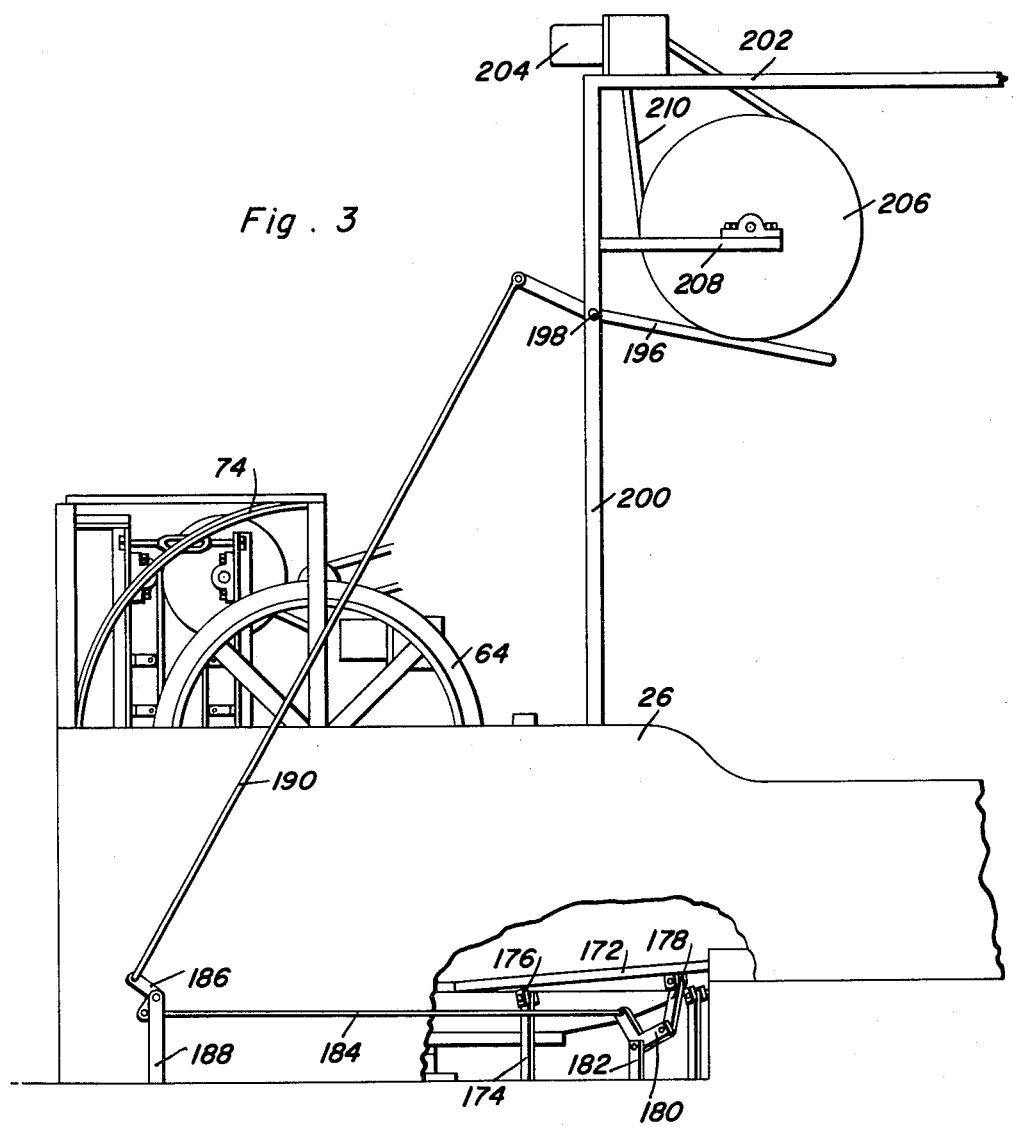
FIGURE 3 is a side elevational view taken from the opposite side from FIGURE 1 with portions of the kickback broken away illustrating the structure for elevating the corner pieces of the pit.

The pit area 20 includes a recess 28 having a pair of turntables 30 and 32 disposed therein. The turntable 30 is circular in configuration while the turntable 32 is annular in configuration and is concentric with and co-planar with the turntable 30. As illustrated in FIGURE 2, the inner turntable 30 rotates in a counter-clockwise direction while the outer turntable 32 rotates in a clockwise direction.

Disposed above the turntables 30 and 32 and towards the front portions thereof is a crossbar 34 pivotally supporting a framework 36 having a cushion 40 on the front lower surface thereof thereby forming a cushion for engagement by the pins and balls as they move rearwardly from the alley 12. Also, a curved deflector plate 42 is mounted on the kickbacks 24 and 26 in any suitable manner and the deflector plate 42 preferably is of heavy rubber construction as is the cushion 40 and the inner surface of the kickbacks 24 and 26 thereby assuring that the pins and balls will not be damaged during their engagement with the various components of this invention.

The lower end of the frame 36 which supports the cushion 40 is resiliently retained in position by shock absorbing rod 44 slidably mounted in bearing brackets 46 carried by elongated support bar 48 extending to a rear wall 50. Each end of the rod 44 is provided with an abutment 52 and a coil compression spring 54 is disposed between the rear abutment 52 and the rear bearing block or bracket 46 and a coil spring 56 is disposed between the forward abutment 52 and the forward bearing block or bracket 46 thereby resiliently centralizing the shock absorber rod 44. The forward abutment 52 rides against the rear surface of vertical uprights in the frame 36 thus biasing the frame 36 and a cushion 40 back towards a normal vertical position. As illustrated in FIGURE 2, there are two cushioning assemblies, one adjacent each side thereby cushioning the cushion 40 and enabling it to move rearwardly slightly by compressing the spring 56 with the spring 54 serving to dampen the return movement of the rod 44 due to the natural tendency of the spring 56 to return to a relaxed position. The forward abutments 52 may have small rollers 58 journaled thereon for facilitating the rolling engagement of the abutments 52 with the frame 36.

With this arrangement, all bowling pins and balls deposited into the pit area 20 will either fall on the counter-rotating turntables 30 and 32 or be projected against the deflector 42 or the cushion 40 in which event the pins and balls will still be deposited on the surface of the counter-rotating turntables 30 and 32 forwardly of the cushion 40. As illustrated in FIGURE 2, the cushion 40 terminates in spaced relation to the kickback 26 with the terminal end thereof being designated by numeral 60. The lower edge of the cushion 40 is spaced above the turntables 30 and 32 a distance less than the diameter of the bowling balls 18 thus assuring that the bowling balls can only pass rearwardly of the cushion 40 outwardly of the terminal end 60. As illustrated in FIGURE 2, the terminal end 60 of the cushion 40 is disposed over the turntable 32 so that the bowling balls will only pass rearwardly on the turntable 32 in the direction of the arrow in FIGURE 2. This arrangement will enable all the bowling balls to pass under a wheel 62 having an inflated tire 64 thereon. The wheel 62 is provided with suitable spokes 66 and a hub 68 carried by a shaft 70. The distance of the wheel 64 at its bottom point from the surface of the turntable 32 is slightly less than the diameter of a bowling ball 18 whereby the bowling ball will be gripped and rolled by the pneumatic tire 64. The orientation of the wheel 62 and tire 64 thereon is such that it is substantially spaced from the kickback 26 a distance with the center line thereof equal to the radius of the bowling ball so that the normal movement of the ball to the outer edge of the turntable 32 due to centrifugal force will assure that the bowling ball will be properly registered with the tire so that it will convey the bowling ball upwardly along an arcuate trackway 72 having a rubber covering 74 on the inner surface thereof and being channel shaped or arcuate on the inner surface for guiding the ball 18 as it moves upwardly along the trackway onto an inclined ramp or track 76 of any suitable construction so that the inclined ramp or track 76 will return the ball back to the other end of the alley. At the bottom of the trackway 72 there is provided a movable segment 78 mounted on an arm 80 pivotally supported by a support bracket 82 and biased towards an upper position by a spring 84 so that when a bowling ball passes up the trackway 72, the segment 78 will be moved downwardly against the spring 84 so that the spring 84 will return the segment 78 to a position above the plane of the trackway 72 after the ball has passed. A switch mechanism 86 is engaged by the outer end of the arm whereby the passage of each ball may be indicated or felt by the switch mechanism thereby enabling the bowling balls to be counted so that the remainder of the mechanism such as the sweeper bar mechanism and the turret head mechanism (both not shown) may be automatically operated.

At the rear of the counter-rotating turntables 30 and 32 is the bowling pin elevating mechanism generally designated by the numeral 90 which includes a pair of endless flat rubber belts 92 and 94 which are preferably corrugated on the outer surface thereof for grippingly engaging a bowling pin 14 so that the bowling pin will be supported from the belly portion thereof with the neck depending. The belts 92 and 94 are entrained over bottom pulleys 96 and 98 and top pulleys 100 and 102. The pulley 96 is carried by a shaft 104 while the pulley 102 is carried by a shaft 106 journaled in bearing blocks 108 supported on vertical support members 110 that are supported from the back wall 50 by brackets 112 or any other suitable means. The pulley 98 is supported on a shaft 114 while the pulley 100 is supported on a shaft 116 carried by pulley blocks 118 on vertical support members 120 which are connected to the support members 110 by a turnbuckle assembly 122 thus enabling the spatial relationship between the facing runs of the conveyor belts 92 and 94 to be adjusted for assuring proper gripping relationship of the belts 92 and 94 to the bowling pins 14.

For feeding the bowling pins to the conveying mechanism 90, there is provided a pair of rollers 124 carried by shafts 126 which are movably supported and driven by the belts 128, one of which is twisted as at numeral 130 for feeding the bowling pins 14 into the space between the lower ends of the belts 92 and 94. The drive for the rollers 124 is supplied from a vertical shaft 132 having a V-belt connection 134 with a vertical shaft 136 that is connected with the V-belt 128 for driving one of the rollers 124 while the other of the rollers 124 is connected through the twisted V-belt 130 by virtue of the shaft 126. Thus, the rollers 124 may swing about the axes of the shafts 132 and 136 respectively with there being resilient means provided for retaining the rollers 124 in normal position. The rollers 124 may be covered with any suitable resilient material such as sponge rubber or the like to assure that the bowling pins will be aligned with and fed into the space between the lower pulleys 96 and 98 for picking up by the belts 92 and 94.

For driving the vertical shaft 132 there is provided a motor and reduction gear assembly 138 which also drives an upper pulley 140 connected to a belt 141 extending across a portion of the turntable 30 for connection with a vertical shaft 142. The vertical shaft 142 has a pulley 144 on the top thereof in driving engagement with a V-belt 146 engaging a large pulley 148 disposed above the turntable 30 and connected thereto by virtue of a shaft 150. The lower end of the shaft 142 is provided with a pulley connected with a V-belt 152 extending radially outwardly of the turntables to a pulley 154 on a vertical shaft 156 which extends below the turntables and has a pulley on the lower end thereof provided with a V-belt 158 for engaging a pulley on the outside turntable 32 designated by reference numerals 160 for driving the turntables 30 and 32 in counter-rotational directions.

Extending radially across the upper surface of the turntable 30 and the turntable 32 is a deflector plate 162 supported by a suitable bracket 164 extending to the rear wall 50. The inner end of the deflector 162 is provided with an arcuate portion 166 which partially encircles the shaft 150 thus assuring that any pins which pass under the cushion 40 in a counter-clockwise direction will engage the deflector plate 162 and move radially outwardly onto the clockwise rotating turntable 32 whereupon the pins will then proceed around and be discharged by the conveying mechanism. The deflector plate 162 is closely disposed in relation to the turntables and will prevent movement of pins any further to the rear than the deflector 162.

There is also provided a deflector plate 168 disposed outwardly of the outer turntable 32 and generally in alignment with the outer of the rollers 124. The deflector 168 is supported by suitable brackets 170 extending to the rear wall 50 for guiding and deflecting pins into the feeding rollers 124.

The forward corner areas of the pit area are filled with corner members 172 which have an inner edge conforming with the periphery of the outer turntable 32. The corner members 172 are elevatable at their outer ends for forming an inclined surface so that any pins or balls located thereon will be discharged onto the counter-rotating turntables. This is accomplished by the inner end or edge portion of each corner member 172 being supported by a bracket 174 and a pivotal connection 176 at the upper end thereof. The outer end of each corner member is supported by a pivotally connected link 178 having the upper end thereof pivotally connected to the corner member 172 and having the lower end thereof connected to one end of a bellcrank 180. The apex of the bellcrank 180 is pivotally supported by a bracket 182 and the other arm of the bellcrank 180 has the end thereof pivotally attached to an elongated connecting rod 184. The connecting rod 184 is connected at its other end to one arm of another bellcrank 186 having the apex supported from a bracket 188 and having the other end thereof connected to an elongated upwardly extending rod 190. The bellcrank 186 is rigid with a transverse rod 192 extending transversely of the turntable assemblies with the rod 192 being rigidly affixed to an offset arm 194 at the other end thereof for connection with a similar mechanism for elevating the oppositely disposed corner member 172.

The upper end of the elongated rod 190 is pivotally connected to one end of an elongated arm 196. The elongated arm 196 has a central portion thereof pivotally supported by a pivot pin 198 on an upstanding support member 200. The support member 200 has a horizontal support 202 at the upper end thereof supporting a motor and reduction gear assembly 204 which drives an enlarged pulley 206 which is supported on brackets 208 and which is driven by the belt 210. The pulley 206 is normally provided for operating the sweep bar mechanism (not shown) and is provided with a laterally extending projection 212 thereon which acts as a cam and engages the end of the arm 196 on the opposite side of the pivot 198 from the point of connection with the elongated rod 190 whereupon the arm 196 will be depressed or pivoted for each revolution of the pulley 206 thus serving to cause upward and downward pivotal movement of the corner members 172 thus assuring that no pins or balls will become lodged in the forward corners of the pit area 20.

A motor and reduction gear assembly 214 is mounted on the support member 48 and includes an output shaft 216 extending to opposite directions thereof with one end thereof driving the upper shafts 106 and 116 respectively by V-belts 218 and 220. Also driven from this shaft is a V-belt 222 for driving a V-belt conveyor 224 which receives the pins from the elevator mechanism. The shaft 116 is also provided with a pair of rigid circular disks 226 which have a covering or annular area of sponge rubber or foam plastic thereon which frictionally grips the pins 14 and holds them in an inclined position during the time they are transferred from the disks 226 onto the V-belt conveyor 224 which extends forwardly to a turret mechanism (not shown).

Also, the output shaft 216 engages a V-belt pulley 230 which drives the wheel 62 for elevating the bowling balls.

With this construction, the pins and balls are picked off the top surface of the outside rotating turntable and the pins are spread out by the action of the inside counter-rotating turntable. The structure also eliminates tumbling of the pins and the pins and balls are always handled by rubber covered parts thus reducing damage to the pins which is an extremely large problem existent with automatic pin setting devices.

The counter-rotating turntables 30 and 32 as well as the ball elevating mechanism and pin elevating mechanism may be continuously operated during the period which the bowling alley is in operation or the units may be operated by any suitable mechanism that will sense the presence of a bowling ball or pin in the pit area such as a transversely extending electric eye beam and photo cell unit. Also, the particular drive mechanisms may be varied as desired with the feeds of the various components also be variable to enable the pin and ball separator and conveyor to operate more rapidly or more slowly in order to clear the pit area more rapidly or more slowly as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bowling ball and pin separator and conveyor comprising a pair of concentric counter-rotating turntables adapted to be disposed in the pit area of a bowling alley for receiving pins and balls on the upper surface thereof, ball return mechanism located generally tangentially of the outer turntable adjacent one side and to the rear whereby centrifugal force exerted on the ball as it proceeds with the outer turntable will cause the ball to enter the ball return mechanism, said ball return mechanism being incapable of picking up pins, a pin elevator located at the rear portion of the outer turntable for elevating the pins for deposit in a turret conveyor, a cushion extending transversely of the pit area above the turntables and disposed between the center of the inner turntable and the forward edge thereof for cushioning balls and pins moving rearwardly from the pin deck of the bowling alley, and deflector means mounted above the surface of the turntables and disposed adjacent thereto for deflecting pins from the inner turntable radially outwardly toward the outer turntable, said cushion being disposed above the surfaces of the turntables a distance sufficient to enable passage of pins thereunder but prevent the passage of bowling balls thereunder, one end of the cushion being open for enabling passage of the balls rearwardly only on the outer turntable thereby assuring that the balls will be engaged with the ball return mechanism, said deflector means being disposed rearwardly of the cushion and guiding pins for entry into the pin elevator.

2. The structure as defined in claim 1 wherein said ball return mechanism includes a driven wheel rotatable about substantially a horizontal axis and having an inflated pneumatic tire thereon spaced above the outer turntable a distance greater than the diameter of a pin, a trackway concentric with the tire and spaced therefrom a distance slightly less than the diameter of the bowling ball whereby the tire will frictionally grip the bowling ball and roll it along the track to an elevated position above the wheel for discharge onto a return trackway, said concentric trackway being generally tangential to the surface of the outer turntable for receiving balls therefrom.

3. The structure as defined in claim 2 wherein said trackway includes a movable segment depressed by the passage of each bowling ball whereby the number of bowling balls elevated may be counted.

4. The structure as defined in claim 1 wherein said pin elevating mechanism includes a pair of endless flat rubber belts entrained over top and bottom pulleys, said rubber belts having vertical facing runs thereof spaced apart a distance slightly less than the diameter of the belly portion of a bowling pin thus frictionally gripping the bowling pin so that the pins will be elevated with the neck portion thereof depending, means for adjusting the spatial relationship between the facing runs of the conveyor belts, feed rollers movably mounted adjacent the bottom edge of the flat belt conveyors, said feed rollers being rotatably driven about substantially vertical axes and being swingable resiliently outwardly about vertical axes for guiding and feeding the bowling pins into the space at the bottom of the belt conveyors.

5. The structure as defined in claim 4 together with a deflector generally disposed tangentially to the periphery of the outer turntable for deflecting pins into the space between the feed rollers.

6. The structure as defined in claim 1 wherein a pair of movable corner members are disposed in the pit area adjacent the alley with the inner edge thereof conforming to the periphery of the outer turntable, and means for elevating the outer corner of the corner members thereby presenting inclined surfaces for assuring any pins or balls disposed thereon will be rolled inwardly onto the counter-rotating turntables.

7. In a bowling alley having a pit area, a ball and pin spreading mechanism comprising a turntable assembly including an inner circular table and an outer annular table arranged in concentric relation to the circular table and having an upper surface coplanar therewith, means rotating the inner and outer tables in opposite directions for spreading the pins and balls over a larger surface area to enable the pins and balls to rest in spaced relation to each other, and deflector means overlying the inner table and the outer table for deflecting pins on the inner table radially outwardly to the outer table.

8. The structure as defined in claim 7 wherein a pit cushion overlies the inner table and the outer table forwardly of the center of rotation thereof and forwardly of the deflector means, said cushion being disposed in spaced relation to the upper surface of the tables a distance less than the diameter of the balls but greater than the diameter of the pins whereby pins on the inner table may pass under the cushion and engage the deflector means whereby balls will not pass under the cushion while on the inner table, one end of the cushion being omitted thereby enabling balls to pass thereunder only when on the outer table.

References Cited by the Examiner
UNITED STATES PATENTS

| | | | |
|---|---|---|---|
| 1,468,212 | 9/23 | Redfield | 273—43 |
| 1,911,436 | 5/33 | Cone | 273—43 |
| 2,341,476 | 2/44 | Parra et al. | 273—43 |
| 2,622,879 | 12/52 | Frye | 273—43 |
| 2,625,397 | 1/53 | Frye | 273—43 |
| 2,686,053 | 8/54 | Phillips | 273—43 |
| 2,689,128 | 9/54 | Dowd et al. | 273—43 |
| 2,699,945 | 1/55 | Frye | 273—49 |
| 2,739,813 | 3/56 | Dowd et al. | 273—43 |
| 2,765,172 | 10/56 | Zuercher et al. | 273—49 |
| 2,815,954 | 12/57 | Zuercher | 273—53 |

DELBERT B. LOWE, *Primary Examiner.*